Feb. 23, 1926.

J. G. ALLMON 1,574,014

ANTISKID CHAIN

Filed Nov. 4, 1924

Inventor,
Joseph G. Allmon.

By Mason Fenwick & Lawrence
Attorneys

Patented Feb. 23, 1926.

1,574,014

UNITED STATES PATENT OFFICE.

JOSEPH G. ALLMON, OF MELROSE, MASSACHUSETTS.

ANTISKID CHAIN.

Application filed November 4, 1924. Serial No. 747,823.

*To all whom it may concern:*

Be it known that I, JOSEPH G. ALLMON, a citizen of the United States, residing at Melrose, in the county of Middlesex and Commonwealth of Massachusetts, have invented certain new and useful Improvements in Antiskid Chains; and I do hereby declare the following to be a full, clear, and exact description of the invention, such as will enable others skilled in the art to which it appertains to make and use the same.

This invention relates to improvements in anti-skid chains for automobiles and to a particular cross link construction which will be provided with a plurality of outwardly and laterally extending barbs which will come into action should the wheels of the automobile commence to skid.

The object of the invention is to provide an improvement in cross link connections for anti-skid chains for automobiles, the said cross links being provided with a plurality of outwardly and laterally extending barbs or prongs which will be formed of different heights so that the prongs adjacent the center or tread of the tire will be shorter than those toward the side walls of the tire.

In the accompanying drawings which form a part of my application,

Like characters of reference are used throughout the following specification and the accompanying drawings to designate corresponding parts.

Figure 1:
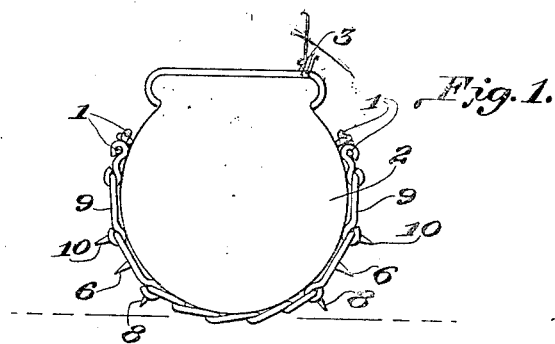
Fig. 1 is a transverse section through a tire and rim showing the cross links of my improved anti-skid chain in position thereon.

My improved anti-skid chain comprises the side links 1 which, when in position, are adapted to extend annularly about the side walls of the tire 2 adjacent the supporting rim 3 on which said tire is mounted.

The side links 1 are connected every few inches about the circumference of the tire with a plurality of interconnected cross links which extend transversely across the tread of the tire 2. It has been found that ordinary links of chain when used for cross links in a measure prevent serious skidding of an automobile, but a certain amount of skidding cannot be prevented. It is to prevent any skidding at all that I have devised my improved cross links 4 which are approximately oval in shape and are provided with reinforcing bars or portions 5. A plurality of alined barbs or prongs 6 are formed on the bar 5, and when the same engage the ground will prevent any movement laterally of the tire. The inner ends of the links 4 are brought together and bent over the adjacent links 7 and carry at their extremities shorter prongs 8 which will be the first to engage the ground if the automobile commences to move laterally.

Links 9 are attached to the opposite ends of the main links 4 and are provided with longer prongs 10 on their contacting inner ends.

Other connecting links of the usual form will, of course, be employed in forming the completed cross chains, it being understood that the main feature of my invention is the provision of the links 4 and the prongs 6, 8, and 10.

Figure 2:
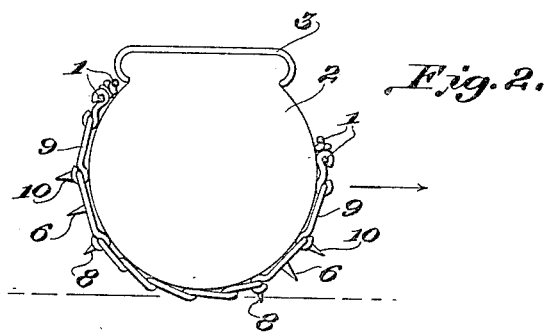
Fig. 2 is a similar view to Fig. 1 showing the position of the cross links the instant the tire commences to make a side skid.
Figure 3:
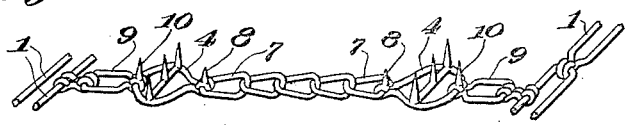
Fig. 3 is a perspective view of the cross link construction and a portion of the side links.
Figure 4:
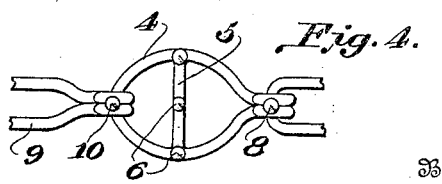
Fig. 4 is a plan view of the cross link which constitutes my invention.

From the foregoing description and the accompanying drawing it will readily be seen that when the chains are in normal position they will appear as shown in Fig. 1, but if the tire commences to slip laterally, as indicated by the arrow in Fig. 2, the chains will then take the position indicated in this figure, so that the barbs 8 will engage the ground first, after which barbs 6 and 10 will be caused to impinge upon the ground and will prevent any further side movement of the tire, thereby bringing the skidding to a complete stop practically before it gets under way at all From the foregoing description, it will be apparent that I have provided a novel and highly efficient form of cross link for use in anti-skid chains for automobiles which will positively prevent side skidding of the automobile when equipped with this form of chain.

Many minor changes in detail of construction may be resorted to without departure from the spirit of the invention.

I claim:

1. In an anti-skid chain having a pair of side chains formed of interconnected links, and a plurality of interconnecting link cross chains, laterally directed anti-skid barbs carried by the side links of said cross chains, substantially as described.

2. In an anti-skid chain having a pair of annularly disposed side chains composed of interconnected links, and a plurality of cross chains connecting said side chains, spaced links in said cross chains provided with anti-sliping barbs of stepped lengths.

3. In an anti-skid chain having annular side chains composed of interconnected links, and a plurality of cross chains connecting said side chains, a pair of spaced barb-carrying links interposed in said cross chains, and barb-carrying links connected between said first-mentioned cross links and said side chains, said barbs being of different lengths to provide a stepped formation from the center of the cross chains to the ends thereof.

4. In an anti-skid chain having annular side chains composed of interconnected links, a plurality of plain cross chains interposed between said side chains and a widened barb-carrying link connected at the opposite ends of each of said cross chains between the same and said side chains, said barbs being of different lengths to provide a stepped formation from the center of the cross chains to the ends thereof.

5. Means for preventing the skidding of a vehicle wheel comprising in combination two circular side chains secured together by a plurality of transverse tread chains, said side chains adapted to be positioned on either side of the wheel, and a plurality of barbs mounted adjacent the side chains and normally out of contact with the ground, said side chains of a diameter proportional to the diameter of the wheel to permit limited longitudinal movement to the tread chains transversely to the wheel responsive to a sideways slipping of the wheel, whereby the barbs adjacent one of the side chains will be drawn by said sideways slipping of the wheel into engagement with the ground.

In testimony whereof I affix my signature.

JOSEPH G. ALLMON.